(12) United States Patent
Wittman

(10) Patent No.: US 6,304,654 B1
(45) Date of Patent: Oct. 16, 2001

(54) TELEPHONE HANDSET INTERFACE WITH FEEDBACK CONTROL

(75) Inventor: Brian Albert Wittman, Indianapolis, IN (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/094,032

(22) Filed: Jun. 9, 1998

Related U.S. Application Data

(63) Continuation of application No. 08/597,592, filed on Feb. 6, 1996, now Pat. No. 5,867,573.

(51) Int. Cl.[7] .................................................. H04M 1/20
(52) U.S. Cl. ...................... 379/387.01; 379/392; 379/395
(58) Field of Search ..................................... 379/387–392, 379/395, 398–399, 402–403, 406, 410

(56) References Cited

U.S. PATENT DOCUMENTS

| | | | |
|---|---|---|---|
| 4,715,063 | * 12/1987 | Haddad et al. | 379/390 |
| 4,773,088 | * 9/1988 | Matheny | 379/395 |
| 5,170,430 | * 12/1992 | Schuh | 379/389 |
| 5,867,573 | * 2/1999 | Wittman | 379/387 |

* cited by examiner

*Primary Examiner*—Curtis Kuntz
*Assistant Examiner*—George Eng

(57) ABSTRACT

A telephone handset interface reduces or eliminates feedback induced singing in a telephone handset/hybrid loop. The interface provides for user selectable volume control settings, each setting representing an amount of gain or loss to be applied to the transmit and receive signals within the telephone set. The gain settings are selected to limit overall loop gain so as to reduce or eliminate any tendency of the handset to sing at high receive gain levels. Loss inserted into the transmit circuit is removed when user speech is detected in the transmit circuit.

2 Claims, 2 Drawing Sheets

Figure 1:
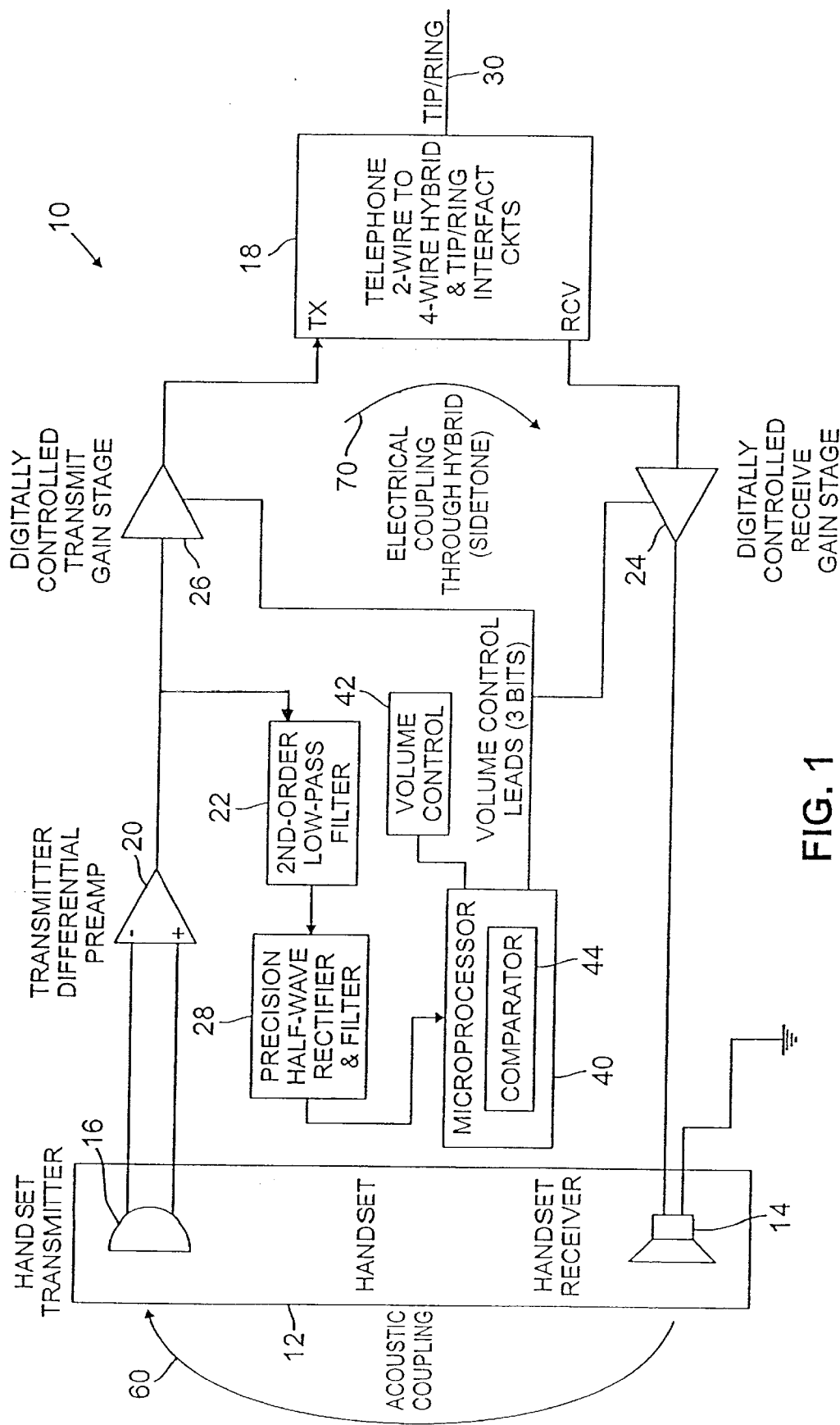

| VOL. CONT. BIT #2 | VOL. CONT. BIT #1 | VOL. CONT. BIT #0 | VOLUME SET POINT **Set Point 1 is default | HANDSET RECEIVE GAIN (dB relative to nominal) | HANDSET TRANSMIT GAIN (dB relative to nominal) |
|---|---|---|---|---|---|
| 0 | 0 | 0 | 0 | -3.3 | 0.0 |
| 0 | 0 | 1 | 1** | 0.0 | 0.0 |
| 0 | 1 | 0 | 2 | 3.2 | 0.0 |
| 0 | 1 | 1 | 3 | 6.5 | 0.0 |
| 1 | 0 | 0 | 4 | 9.9 | -3.3 |
| 1 | 0 | 1 | 5 | 13.2 | -6.6 |
| 1 | 1 | 0 | 6 | 16.6 | -10.0 |
| 1 | 1 | 1 | 7 | 19.8 | -13.3 |

FIG. 2

TELEPHONE HANDSET INTERFACE WITH FEEDBACK CONTROL

This application is a continuation of U.S. patent application Ser. No. 08/597,592 which was filed Feb. 6, 1996, now U.S. Pat. No. 5,867,573.

BACKGROUND OF THE INVENTION

1. Field of the Invention

The present invention is related to the field of telephone set features and apparatus, and specifically those directed at reducing or eliminating handset feedback.

2. Description of the Related Art

It is not uncommon for currently available telephone sets to be equipped with volume controls for increasing or decreasing the amount of gain applied to the receiver circuit of the telephone handset. Such controls are added to accommodate the hearing impaired, to overcome excessive background noise, as well as to compensate for variances in transmission quality from one telephone call to the next. They are generally limited to adding 12 db or less of gain, so as to minimize the chance that the signal fed to the handset receiver will be introduced to the handset transmitter, resulting in the creation of a loud and unpleasant tone being sent through the receiver. This tone, caused by a feedback loop established between the receiver and transmitter of the handset, is commonly referred to as singing, but has also been referred to as howling, squealing, screeching, or simply feedback. However, even at the presently practiced limit of 12 db of receiver gain the potential for singing exists, depending on the impedance of the telephone line and the acoustic environment surrounding the handset.

As is well known in the art, the feedback loop which causes singing is created in part by acoustic coupling between the handset receiver in the handset earpiece and the handset microphone in the handset mouthpiece. The feedback loop is completed by electrical coupling between the transmit and receive circuits in the telephone hybrid.

As is well known in the art, telephone signals to and from a telephone are carried through two wires, long known in the telephony field as tip and ring. Within the telephone set these two wires connect to the telephone hybrid. The hybrid splits the tip and ring into a four wire circuit, two wires of which pass the far end caller's signal from the hybrid to the handset receiver as a receive signal. The remaining two wires carry a transmit signal from the handset transmitter to the hybrid for transmission over the tip and ring to the far end caller.

A perfect hybrid would result in no signal component leakage between the transmit and receive circuits of the hybrid, i.e., perfect sidetone cancellation or infinite trans-hybrid loss. In practice, trans-hybrid loss is never infinite and, instead, depends on how close the hybrid impedance network matches the actual line impedance of the phone line to which the telephone apparatus or set is connected. Since, in general, telephone line impedance is complex and is not known a priori by the telephone set, trans-hybrid loss is usually only about 6 db to 10 db. This means that a reduced amplitude version of the transmit signal will always be present in the receive signal. If the sum of the acoustic coupling, electrical coupling through the hybrid, and circuit gains exceed unity, the telephone will sing or howl.

For example, if the line impedance of the telephone line to which the phone is connected represents a significant impedance mismatch for the hybrid, and the handset is placed on a hard, acoustically reflective surface such as a smooth desk or countertop, the gain in this loop may exceed unity at some frequencies, causing singing to occur.

Moreover, this problem cannot be overcome by simply reducing the gain of the transmit signal when the receive signal gain is increased, which would merely reduce the volume of the speech heard at the far end by the other caller.

The present invention is directed at overcoming the aforementioned shortcomings found in presently known telephone sets.

SUMMARY OF THE INVENTION

The invention provides a handset interface apparatus for placement in a telephone set between the telephone hybrid and the telephone handset.

The inventive handset interface is preferably constructed as an electronic circuit controlled by a microprocessor. The handset interface contains a volume control circuit which allows the telephone user to vary up or down the amount of gain applied to the receive and transmit signals passing between the handset and the hybrid, thus affecting the amplitude of the signals which ultimately pass through tip and ring between the telephone user and a caller on the far end of the call.

The volume control is by way of example selectably adjustable by the user to one of eight volume set points. Each set point represents a particular amount of gain to be applied to the transmit and receive signals. All gains are gains relative to the nominal handset level, i.e. to no gain on the transmit or receive signal. The gain amounts for each volume set point are configured such that the overall gain introduced into the handset/hybrid loop preferably do not exceeds 6.6 db.

However, the application of negative amounts of transmit gain during the entire conversation would hamper the overall call quality, since the transmit signal would be attenuated while the telephone user is speaking. This would make the user's voice sound unnaturally low to the far end caller. To overcome this potential problem, a further feature is included in the handset interface. Specifically, the handset interface detects the presence of the transmit signal, and measures its amplitude at a point in the interface circuitry before the gain reduction is applied. If the pre-gain transmit signal amplitude exceeds a predetermined threshold value, and the user has selected any one of volume set points four through seven, the volume set point is changed by the handset interface to set point three, a set point which represents 0 db of gain being applied to the transmit signal. Thus, if the telephone user selects high volume settings, the handset interface automatically removes any transmit signal gain reduction while the user is speaking. The set point is then reset to the user selected set point when the user stops speaking.

For improved performance, the transmit signal may be filtered prior to its comparison with the threshold values to prevent self-switching of the handset interface, in the absence of user speech, as a result of acoustic coupling of high frequency components of the sound emanating from the handset receiver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING FIGURES

In the drawings, which are illustrative and not to scale, and wherein like reference characters denote similar elements throughout the several views:

FIG. 1 is a schematic block diagram of the major components of a preferred embodiment of an apparatus constructed in accordance with the instant invention; and FIG. 2 is a table depicting by way of illustration the transmit and receive gain amounts applied at each user selectable volume set point.

DETAILED DESCRIPTION OF THE PREFERRED EMBODIMENTS

With initial reference to FIG. 1, there is depicted a schematic block diagram of an illustrative handset interface 10 constructed using a presently preferred selection of components. It will of course be recognized by the routineer in the art that the depiction or description of any one type of circuit component or device is offered merely as a non-limiting example of a presently preferred design alternative, there being many such choices and alternatives available in the electrical and electronic arts to achieve the intended functionality of the inventive handset interface.

As seen in FIG. 1, the interface 10 is intended to be incorporated or placed in the housing of a telephone apparatus or set (not shown) between the telephone hybrid 18 and the telephone handset 12, both of these telephone components being well known in the art and forming no part of the instant invention. The hybrid 18 directs a receive signal sent from a remote or far end conversant over tip and ring lines or circuit 30 to handset receiver 14, where the receive signal is converted to sound heard by the telephone user. Receiver 14 is generally constructed as a small speaker in the earpiece of handset 12.

The local telephone user typically speaks into handset transmitter 16, likewise generally constructed as a microphone in the mouthpiece of the handset 12, which generates a transmit signal that is directed by the hybrid 18 over tip and ring 30 to be heard as sound by the far end conversant. Potential paths of feedback which can contribute to singing are depicted in FIG. 1 as acoustic coupling path 60 and electrical coupling path 70.

Interposed between the hybrid 18 and transmitter 16 is a transmitter differential preamp 20, preferably implemented as an integrated circuit op-amp or an art recognized equivalent, for amplifying the transmit signal generated when the telephone user speaks into handset transmitter 16. The amplified transmit signal from preamp 20 is fed to a digitally controlled transmit gain stage 26 which, under the control of microprocessor 40, is operable to selectively apply negative or positive amounts of gain to the transmit signal. The gain adjusted transmit signal is then fed to hybrid 18 for transmission over tip and ring 30 to a far end conversant as discussed above.

Interposed between the hybrid 18 and receiver 14 is a digitally controlled receive gain stage 24 which, similarly under the control of microprocessor 40, is operable to selectively apply negative or positive amounts of gain to the receive signal passing from tip and ring 30 through hybrid 18 as discussed above. The gain adjusted receive signal is then fed to receiver 14 for conversion to an acoustic signal to be heard as sound by the local telephone user.

With reference now to FIGS. 1 and 2, the amount of gain applied to the transmit and receive signals is selectably controllable by the local telephone user via volume control 42. The volume control 42 is connected to microprocessor 40 which, in response to the setting thereof selected by the user, causes one of eight combinations of three volume control bits to be sent to the receive gain stage 24 and the transmit gain stage 26. Both the receive and transmit gain stages 24 and 26 are preferably digitally controlled integrated circuits which, in response to the particular sequence of three control bits output by microprocessor 40, vary the gain applied to the receive and transmit circuits respectively. For example, receive and transmit gain stages 24 and 26 may be implemented as digitally controlled switches that route the respective transmit and receive signals to alternate taps of a resistor network, as a function of the volume control bit sequence. One skilled in the art will of course recognize numerous other methods and arrangements similarly suitable for varying gain in response to a volume control signal.

As seen in FIG. 2, each of the eight volume control set points, numbered zero through seven, represents a particular predetermined amount of gain to be applied to the respective receive and transmit signals. For example, a user-selected volume set point of 1 causes, by way of illustration, microprocessor 40 to output a three bit volume control signal in which volume control bit 2 equals zero, volume control bit 1 equals zero, and volume control bit 0 equals one; this results in 0 db of gain being applied to the receive signal and 0 db of gain being applied to the transmit signal. This is preferably the system default setting at which both signals are maintained at their nominal values, i.e. the standard handset volume designed for the particular telephone set. As will be recognized by one skilled in the art, nominal design values for the transmit and receive signals will vary, and are generally a matter of simple design choice.

With continued reference to FIG. 2, as the user—selectable volume set point is varied, the volume control bits change values as therein shown. Volume set points numbered zero through three produce the first four of eight presently preferred receive gain values, which range from about −3.3 db to about 6.5 db, stepped in approximately 3.3 db increments. Transmit gain values for all set points zero through three are 0 db. Set points numbered four through seven provide the remaining four presently preferred receive gain values, which range from about 9.9 db to about 19.8 db, stepped in approximately 3.3 db increments, and the remaining presently preferred transmit gain values, which range from about −3.3 db to about −13.3 db, stepped in approximately −3.3 db increments.

As should now be apparent, at high volume set points the transmit gain is reduced as receive gain is increased. The gain amounts for each of the eight volume set points are preferably so configured that the overall gain introduced into the handset/hybrid loop never exceeds approximately 6.6 db. In this way, even at significantly increased receive gain levels, such as those resulting from the selection of volume set points four through seven, the sing margin is only 6.6 db less than a nominal telephone with no additional receive gain. Thus, the selective application of negative amounts of gain to the transmit signal path maintains system stability even at receive gain settings as high as 19 db, i.e. volume set point seven.

The particular above-described gain values are, of course, set forth by way of non-limiting example. These values may for example vary or be varied as a function of the nominal signal values present in a particular telephone set and the environment in which the telephone set will be used. It will be recognized by one those ordinary skill in the art of telephone set design that the particular gain values described in the table of FIG. 2 are generally a matter of routine design choice which may be varied to suit a particular application or utility without departing from the spirit of the invention. Additionally, the number of volume set points may be increased or decreased from the eight hereinbefore described to accommodate particular design wishes or requirements, as may the incremental value of gain applied from setting to setting, which may be uniform or vary up or down from +/−3.3 db between settings. Indeed, the set points and gain values need not be provided as a discrete number of set points but may be continuously variable within a range.

While the addition of negative amounts of gain to the transmit signal keeps the system stable at high receive signal levels, it will be recognized that in some circumstances arrangement may have a negative impact on the quality of the resulting transmit signal when the user speaks. The far end conversant will be presented with a greatly attenuated transmit signal, causing him or her to hear the local user at very low volumes, or perhaps not at all. To overcome this potential shortcoming, and in accordance with the invention, microprocessor 40 detects the presence of a transmit signal and switches the volume setting while a transmit signal is present from the user selected value to a preselected set point representing optimal transmit and receive signal levels, preferably a set point at which 0 db of transmit gain is applied.

Thus, while the local telephone user is speaking, any attenuation applied to the transmit signal is removed so as to maximize sound quality at the far end. When the user stops speaking, microprocessor 40 returns the volume setting to the user selected volume set point. As presently contemplated, the predetermined optimal transmit and receive levels occur at, and therefore the preselected set point is set to, set point number three of the disclosed embodiment. This volume switching feature is further described hereinbelow.

Thus, and referring once more to FIG. 1, the detection of user speech is carried out by a detection circuit which includes a low pass filter 22 and a half wave rectifier and filter 28, serially connected between the output of transmitter differential preamp 20 and microprocessor 40. The transmit signal from filter 22 and rectifier 28 is fed to microprocessor 40 in which it is applied to a comparator 44 within or implemented by microprocessor 40, or may be external to microprocessor 40. Comparator 44 compares the amplitude of the transmit signal to a predetermined threshold amplitude. If the transmit signal amplitude is equal to or greater than the predetermined threshold amplitude, then comparator 44 signals the microprocessor 40 to switch volume settings from the user-selected set point to the predetermined set point, as described above. When the transmit signal amplitude falls below the threshold, the volume setting is maintained at or returned to the user-selected volume set point. The selection of the threshold amplitude level for comparator 44 is a matter of design choice within the skill of the telephony routineer, and will depend on such factors as the nominal signal levels present in the telephone set and the environment of expected use, among others.

With further reference to FIG. 2, it will be recognized that the above-described transmit gain adjustment function need only be carried out when the user-selected volume setting is at volume set points four through seven of the herein disclosed illustrative embodiment, since these are the only settings at which negative amounts of gain are applied to the transmit signal.

As previously mentioned, at high receive volume levels, the potential exists for acoustic coupling, along path 60, to occur between the receiver 14 and transmitter 16. Such coupling may cause the generation of a transmitter signal which exceeds the comparator threshold level even in the absence of user speech, causing the microprocessor 40 to undesirably switch or change volume levels when the user is not speaking. This self-switching condition is much more likely to occur at higher receive signal frequencies, due to the poor far-field coupling characteristics of the handset at low frequencies; indeed, in practice handset acoustic coupling decreases dramatically below 1000 Hz. It is for this reason that the low pass filter 22 is inserted between transmitter differential preamp 20 and microprocessor 40 to filter high frequencies above 1000 Hz before the transmit signal reaches comparator 44 and thereby limit the possibility of undesired self-switching. Additionally, since only the amplitude of the filtered transmit signal is of interest to comparator 44, the precision half-wave rectifier and filter 28 is used to extract the amplitude envelope of the filtered transmit signal from low-pass filter 22, and it is the filtered, rectified signal which is then passed to comparator 44 for comparison with the predetermined threshold amplitude level. Of course, the particular low-pass frequency of filter 22 may be varied from that described to accommodate the frequency characteristics of the particular telephone set to which the inventive interface circuit is applied or otherwise as a general matter of design choice.

As a further refinement, hysteresis may be designed into comparator 44 to eliminate unintendedly rapid switching between volume set points or gain levels, known in the art as fluttering, at signal levels close to the predetermined threshold level.

It will also be recognized that while the currently preferred embodiment contemplates digital control of the analog transmit and receive signals, the same functionality could alternatively be implemented utilizing entirely or partially analog circuitry. Likewise, the transmit and receive signals may be digitized, and each of the functions described above may be carried out using digital signal processing techniques. Each of these, and similar alternatives is fully intended to be within the scope of the invention and is well within the skill of the telephony routineer to carry out.

Thus, while there have shown and described and pointed out fundamental novel features of the invention as applied to preferred embodiments thereof, it will be understood that various omissions, and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A telephone handset interface for connecting, in a user controlled telephone, a telephone hybrid and a telephone handset which includes a transmitter for producing a transmit signal and a receiver for receiving receive signals from the hybrid, said interface comprising:

means, connected between the receiver and the hybrid, for applying a predeterminately variable amount of gain to the receive signal from the hybrid;

means, connected between the transmitter and the hybrid, for applying a predeterminately variable amount of gain to the transmit signal from the transmitter;

means for simultaneously controlling said receive signal gain applying means and said transmit signal gain applying means to vary the amount of gain applied to the receive and transmit signals, said simultaneous control means being selectably adjustable by user selection through a plurality of volume set points each one of the plurality of volume set points representing a receive gain value defining a first fixed amount of gain for application to the receive signal and a transmit gain value defining a second fixed amount of gain for application to the transmit signal, said first and second fixed gain amounts for each of said plurality of volume setpoints being preselected to minimize feedback between the transmitter and receiver and thereby prevent singing in the handset;

means, connected to the transmitter, for detecting an amplitude of the transmit signal; and said means for simultaneously controlling further comprising means for comparing the detected amplitude of the transmit signal to a threshold value for determining when a user of the telephone handset is speaking, wherein said means for simultaneously controlling includes means for applying a nominal one of said plurality of volume setpoints when the detected amplitude of the transmit signal is greater than the threshold value and applying the user selected one of said plurality of volume setpoints when the detected amplitude of the transmit signal is equal to or less than the threshold value.

2. The interface of claim 1, wherein said detecting means further comprises means, connected between the transmitter and said comparison means, for generating a filtered transmit signal by filtering from the transmit signal high frequency components arising from acoustic coupling of the transmit and receive signals.

* * * * *